United States Patent
Guo

(10) Patent No.: US 12,425,915 B2
(45) Date of Patent: Sep. 23, 2025

(54) QUALITY OF SERVICE (QoS) CONTROL METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Yali Guo, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 412 days.

(21) Appl. No.: 18/145,473

(22) Filed: Dec. 22, 2022

(65) Prior Publication Data

US 2023/0224754 A1  Jul. 13, 2023

Related U.S. Application Data

(63) Continuation of application No. PCT/CN2020/139258, filed on Dec. 25, 2020.

(51) Int. Cl.
*H04W 28/02* (2009.01)
*H04W 88/04* (2009.01)

(52) U.S. Cl.
CPC ........ *H04W 28/0268* (2013.01); *H04W 88/04* (2013.01)

(58) Field of Classification Search
CPC .. H04W 28/0268; H04W 88/04; H04W 28/24
See application file for complete search history.

(56) References Cited

U.S. PATENT DOCUMENTS

| | | | |
|---|---|---|---|
| 2016/0073327 A1 | 3/2016 | Clougherty et al. | |
| 2016/0165481 A1 | 6/2016 | Jin | |
| 2018/0054237 A1 | 2/2018 | Tseng et al. | |
| 2018/0176927 A1 | 6/2018 | Deng et al. | |

(Continued)

FOREIGN PATENT DOCUMENTS

| | | | |
|---|---|---|---|
| CN | 111436081 A | 7/2020 | |
| CN | 112040496 A | 12/2020 | |

(Continued)

OTHER PUBLICATIONS

First Office Action of the Chinese application No. 202080101951.1, issued on Jul. 18, 2024. 29 pages with English translation.

(Continued)

*Primary Examiner* — Abdullahi Ahmed
(74) *Attorney, Agent, or Firm* — PERKINS COIE LLP

(57) ABSTRACT

A Quality of Service (QoS) control method is applied to a first terminal device. The first terminal device accesses a core network of the first terminal device through relay User Equipment (UE) and a first designated network element, and the first terminal device is in communication connection with the relay UE through a first interface. The QoS control method includes that: the first terminal device receives first information, the first terminal device determines traffic filtering information and QoS parameter information according to received first information, and the first terminal device sends the traffic filtering information and the QoS parameter information to the relay UE.

18 Claims, 19 Drawing Sheets

(56) References Cited

U.S. PATENT DOCUMENTS

| | | | |
|---|---|---|---|
| 2020/0344638 A1 | 10/2020 | Ding et al. | |
| 2022/0159753 A1* | 5/2022 | Kuo | H04W 72/1263 |
| 2022/0279348 A1* | 9/2022 | Youn | H04W 12/06 |
| 2022/0287116 A1* | 9/2022 | Kim | H04W 76/12 |
| 2022/0304099 A1* | 9/2022 | Kim | H04W 76/32 |
| 2022/0345879 A1* | 10/2022 | Park | H04W 80/10 |
| 2023/0015829 A1* | 1/2023 | Hyde | H04W 40/28 |
| 2023/0076012 A1* | 3/2023 | Kuo | H04W 76/14 |
| 2023/0199607 A1* | 6/2023 | Adjakple | H04W 40/02 370/310 |
| 2023/0379765 A1* | 11/2023 | Deng | H04W 28/0268 |
| 2024/0015818 A1* | 1/2024 | Kuo | H04W 76/14 |

FOREIGN PATENT DOCUMENTS

| | | |
|---|---|---|
| EP | 3937540 A1 | 1/2022 |
| EP | 4213535 A1 | 7/2023 |
| WO | 2018137364 A1 | 8/2018 |
| WO | 2020172491 A1 | 8/2020 |
| WO | 2020177764 A1 | 9/2020 |
| WO | 2020223629 A1 | 11/2020 |

OTHER PUBLICATIONS

First Office Action of the European application No. 20966543.9, issued on Jul. 10, 2024. 8 pages.

CATT, "KI #3, Sol #45: Update to remove ENs and add clarifications", SA WG2 Meeting #141E e-meeting S2-2008293 Oct. 12-Oct. 23, 2020, Elbonia (revision of S2-2007444). 5 pages.

ZTE Corporation, Sanechips, "Discussion on Remaining issues on L3 relay", 3GPP TSG-RAN WG2 Meeting #112-e R2-2009033, Online, Nov. 2-13, 2020. 5 pages.

Nokia, Nokia Shanghai Bell, FutureWei, "KI#2, New Sol: Solution for offering QoS—simultaneous access to services by PLMN and SNPN", SA WG2 Meeting #140E S2-2005728, Jun. 1-12, 2020, Elbonia, (revision of S2-200). 7 pages.

International Search Report in the international application No. PCT/CN2020/139258, mailed on Sep. 26, 2021. 6 pages with English translation.

Written Opinion of the International Search Authority in the international application No. PCT/CN2020/139258, mailed on Sep. 26, 2021. 7 pages with English translation.

3GPP "Study on system enhancement for Proximity based Services (ProSe) in the 5G System (5GS), (Release 17)" 3GPP TR 23.752 V1.0.0 (Nov. 2020) Technical Specification Group Services and System Aspects. 182 pages.

Supplementary European Search Report in the European application No. 20966543.9, mailed on Dec. 11, 2023. 14 pages.

Second Office Action of the Chinese application No. 202080101951.1, issued on Oct. 8, 2024. 24 pages with English translation.

Decision of Rejection of the Chinese application No. 202080101951.1, issued on Nov. 29, 2024. 25 pages with English translation.

* cited by examiner

S201 — The relay UE receives the traffic filtering and the QoS parameter information sent by the remote UE for performing, by the relay UE, QoS control on the first interface and QoS control on the PDU session of the relay UE

The first core network element sends mapping relationship information to the remote UE for determining, by the remote UE, QoS parameter information; and after the remote UE sends the QoS parameter information to the relay UE, the relay UE performs QoS control on the first interface and QoS control on the PDU session of the relay UE based on the QoS parameter information

The relay UE receives the traffic filtering information and at least one of the QoS parameter of the PDU session of the relay UE or the QoS parameter of the first interface sent by the first network device for performing, by the relay UE, QoS control on the PDU session of the relay UE and QoS control on the first interface

FIG. 9

QUALITY OF SERVICE (QoS) CONTROL METHOD, TERMINAL DEVICE, AND NETWORK DEVICE

CROSS-REFERENCE TO RELATED APPLICATION

This application is a continuation of International Application No. PCT/CN2020/139258 filed on Dec. 25, 2020, the disclosure of which is hereby incorporated by reference in its entirety.

BACKGROUND

A terminal device with Proximity-based Services (ProSe) capability may communicate directly with other terminal devices with ProSe capability through a specified interface. When the terminal device is able to connect to a data network and has ProSe capability, the terminal device may be used as a relay UE, and another terminal device with ProSe capability may be used as remote UE. The remote UE may interact with a Non-3GPP InterWorking Function (N3IWF) through a designated interface and a Protocol Data Unit (PDU) session of the relay UE, and may further access a core network serving the remote UE through the N3IWF to implement communication with the data network.

At present, the QoS requirements between the remote UE and the data network are controlled by the core network of the remote UE, and the N3IWF obtains a QoS parameter for data interaction between the remote UE and the N3IWF from the core network of the remote UE. This QoS control mode may not provide an accurate QoS guarantee for the services between the remote UE and the data network, and needs to be optimized.

SUMMARY

The disclosure relates to the field of communications, and in particular to a Quality of Service (QoS) control method, a User Equipment (UE) device, and a network device.

In view of this, embodiments of the disclosure provide a QoS control method, a terminal device, and a network device.

The embodiments of the disclosure provide a QoS control method, applied to a first terminal device. The first terminal device accesses a core network of the first terminal device through relay UE and a first designated network element, and the first terminal device is in communication connection with the relay UE through a first interface. The QoS control method may include that: the first terminal device receives first information; the first terminal device determines traffic filtering information and QoS parameter information according to received first information; and the first terminal device sends the traffic filtering information and the QoS parameter information to the relay UE.

The embodiments of the disclosure provide a QoS control method, applied to relay UE. Remote UE accesses a core network of the remote UE through the relay UE and a first designated network element, and the remote UE is in communication connection with the relay UE through a first interface. The QoS control method may include that: the relay UE receives traffic filtering information and QoS parameter information sent by the remote UE for performing, by the relay UE, QoS control on the first interface and QoS control on a PDU session of the relay UE.

The embodiments of the disclosure provide a QoS control method, applied to a first network device. Remote UE accesses a core network of the remote UE through relay UE and a first designated network element, the remote UE is in communication connection with the relay UE through a first interface, and the first network device may include a core network element of the relay UE. The QoS control method may include that: the first network device receives first information, the first network device determines a QoS parameter of a PDU session of the relay UE and/or a QoS parameter of the first interface according to the received first information, and the first network device sends traffic filtering information and at least one of the QoS parameter of the PDU session of the relay UE or the QoS parameter of the first interface to the relay UE.

BRIEF DESCRIPTION OF THE DRAWINGS

FIGS. 5-9 are flow block diagrams of a QoS control method according to various embodiments of the disclosure.

DETAILED DESCRIPTION

Figure 1:
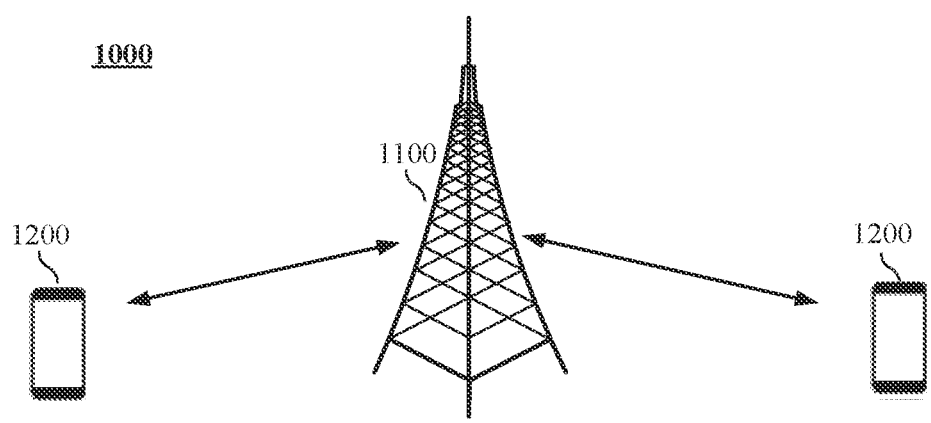
FIG. 1 is a schematic diagram of a communication system architecture according to an embodiment of the disclosure.

Technical solutions in the embodiments of the disclosure will be described below in combination with the drawings in the embodiments of the disclosure.

The technical solutions of the embodiments of the disclosure may be applied to various communication systems, for example: a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolved system of the NR system, an LTE-based access to unlicensed spectrum (LTE-U) system, an NR-based access to unlicensed spectrum (NR-U) system, a Non-Terrestrial Networks (NTN) system, a Universal Mobile Telecommunication System (UMTS), a Wireless Local Area Network (WLAN), Wireless Fidelity (WiFi), a 5th-Generation (5G) system, or another communication system.

Generally speaking, connections supported by a conventional communication system are usually limited in number and also easy to implement. However, with the development of communication technologies, a mobile communication system will not only support conventional communication but also support, for example, Device to Device (D2D) communication, Machine to Machine (M2M) communication. Machine Type Communication (MTC). Vehicle to Vehicle (V2V) communication, or Vehicle to everything (V2X) communication. The embodiments of the disclosure may also be applied to these communication systems.

Optionally, a communication system in the embodiments of the disclosure may be applied to a Carrier Aggregation (CA) scenario, or a Dual Connectivity (DC) scenario, or a Standalone (SA) network deployment scenario.

Each of the embodiments of the disclosure is described in combination with a network device and a terminal device. The terminal device may also be referred to as UE, an access UE, a user unit, a user Station (ST), a mobile ST, a mobile radio ST, a remote ST, a remote UE, a mobile device, a user terminal, a terminal, a wireless communication device, a user agent, a user device, etc.

The terminal device may be a ST in the WLAN, or may be a cell phone, a cordless phone, a Session Initiation Protocol (SIP) phone, a Wireless Local Loop (WLL) ST, a Personal Digital Assistant (PDA), a handheld device with a wireless communication function, a computing device, another processing device connected to a wireless modem, a vehicle-mounted device, a wearable device, a terminal device in a next-generation communication system, for example, an NR network, a terminal device in a future evolved Public Land Mobile Network (PLMN), or the like.

In the embodiments of the disclosure, the terminal device may be deployed on land, including indoor or outdoor, handheld, wearable or onboard, or may be deployed on the water surface (such as a ship), or may be deployed in the air (such as an airplane, a balloon or a satellite).

In the embodiments of the disclosure, the terminal device may be a mobile phone, a Pad, a computer with a wireless transceiving function, a Virtual Reality (VR) terminal device, an Augmented Reality, AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, or the like.

As an example rather than restriction, in the embodiments of the disclosure, the terminal device may also be a wearable device. The wearable device, also referred to as a wearable intelligent device, is a generic term of wearable devices obtained by performing intelligentization designing and development on daily wearing products, such as glasses, gloves, watches, clothes, and shoes. The wearable device is a portable device directly worn or integrated to clothes or accessory of a user. The wearable device not only is a hardware device but also realizes powerful functions by software support, data interaction, and cloud interaction. Generalized wearable intelligent devices include, for example, intelligent watches or intelligent glasses with complete functions and large sizes and capable of realizing all or part of functions independent of intelligent phones, and for example, various types of sign monitoring intelligent bands and intelligent jewelries of which each is dedicated to disclosure functions of a certain type and required to be matched with other devices such as intelligent phones for use.

In the embodiments of the disclosure, the network device may be a device configured to communicate with a mobile device. The network device may be an Access Point (AP) in the WLAN and a Base Transceiver Station (BTS) in the GSM or CDMA, or may be a NodeB (NB) in WCDMA, or may be an Evolutional Node B (eNB or eNodeB) in LTE, or a relay ST or AP, or a vehicle-mounted device, a wearable device, a network device (a gNB) in the NR network, a network device in the future evolved PLMN, or the like.

As an example rather than restriction, in the embodiments of the disclosure, the network device may have mobile characteristics. For example, the network device may be a mobile device. Optionally, the network device may be a satellite or a balloon ST. For example, a satellite may be a Low Earth Orbit (LEO) satellite, a Medium Earth Orbit (MEO) satellite, a Geosynchronous Earth Orbit (GEO) satellite, a High Elliptical Orbit (HEO) satellite, etc. Optionally, the network device may also be a base ST arranged in land, water or another place.

In the embodiments of the disclosure, the network device may provide services for a cell, and the terminal device communicates with the network device through a transmission resource (for example, a frequency-domain resource or a spectrum resource) for the cell. The cell may be a cell corresponding to the network device (for example, a base ST). The cell may belong to a macro base ST or a base ST corresponding to a small cell. Here, the small cell may include: a metro cell, a micro cell, a pico cell, a femto cell and the like. These small cells have the characteristics of small coverage and low transmitted power and are suitable for providing high-rate data transmission service.

FIG. 1 exemplarily illustrates a network device 1100 and two terminal devices 1200. Optionally, a communication system 1000 may include multiple network devices 1100 and another number of terminal devices may be included in coverage of each network device 1100, which is not limited in the embodiment of the disclosure. Optionally, the wireless communication system 1000 shown in FIG. 1 may further include other network entities such as a Mobility Management Entity (MME), and an Access and Mobility Management Function (AMF), which is not limited in the embodiment of the disclosure.

It is to be understood that terms "system" and "network" may usually be exchanged herein. The term "and/or" herein describes an association relationship of associated objects and represents, for example, that three relationships may exist. For example, A and/or B may represent the following three cases: Only A exists, both A and B exist, and only B exists. The character "/" herein generally indicates that the contextual objects are in an "or" relationship.

In the description of the embodiment of the disclosure, the term "correspondence" may mean that there is a direct correspondence or indirect correspondence between the two, or may mean that there is an association relationship between the two, or may mean a relationship between indicating and being indicated, or between configuring and being configured.

In order to clearly explain the idea of the embodiment of the disclosure, first, brief description is made to the related content of QoS control of remote UE in the communication system.

Figure 2:
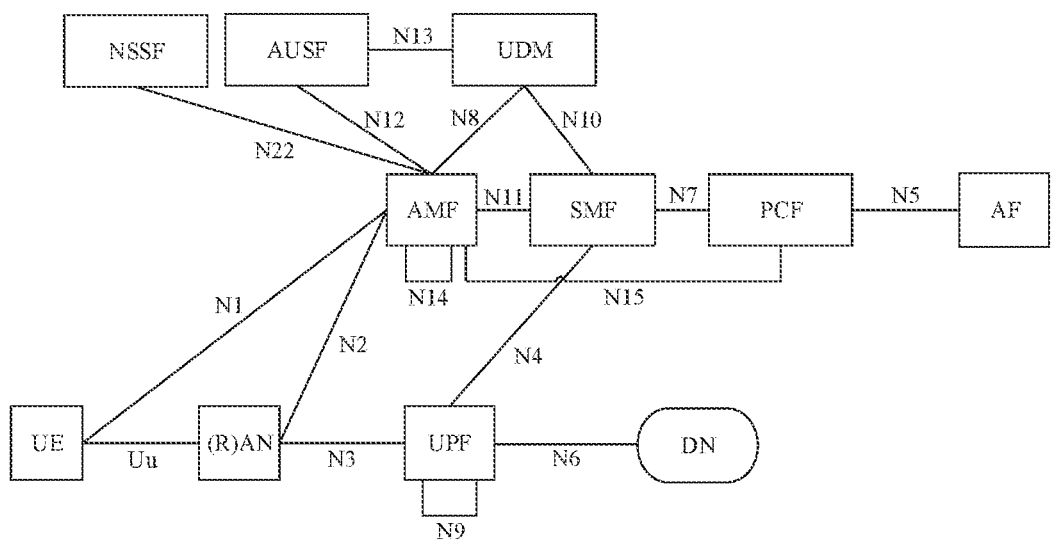
FIG. 2 is a schematic diagram of another communication system network architecture according to an embodiment of the disclosure.

FIG. 2 illustrates a 5G network system architecture in which the UE performs an access layer connection with an Access Network (AN) through a Uu wireless interface to realize access layer message interaction and wireless data transmission. The UE performs a None Access Stratum (NAS) connection with the AMF through an NI interface to realize NAS message interaction. The AMF is a mobility management function in a core network, a Session Management Function (SMF) is a session management function in the core network, and in addition to performing mobility management on the UE, the AMF is also responsible for forwarding session management related information between the UE and the SMF. A Policy Control Function (PCF) is a policy control function in the core network, and is responsible for formulating policies related to mobility management, session management, charging, etc. for the UE. A User Plane Function (UPF) is a user plane function in the core network, and performs data transmission with an external data network through an N6 interface and with the AN through an N3 interface. The UE accesses a 5G network through the Uu interface and then transmits service data through the network.

When a service is initiated, a network layer of the UE obtains a QoS requirement of the service from an upper layer (such as an operating system or an disclosure), and the UE converts the QoS requirement of the service into a QoS parameter of the Uu interface, for example, a 5G QoS Identifier (5QI), sends same to the network, and establishes a PDU session under the control of SMF for data transmission. The 5QI may be mapped to a series of QoS features such as a time delay, a bit error rate and a scheduling priority.

Figure 3:
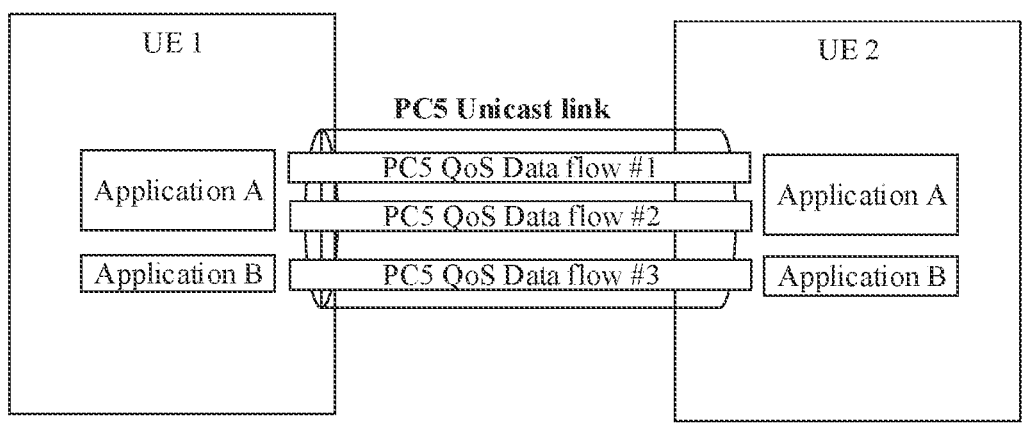
FIG. 3 is a schematic diagram of an architecture of relay UE and remote UE according to an embodiment of the disclosure.

On the other hand, referring to FIG. 3, the UE with ProSe capability may directly communicate with another UE with ProSe capability through a PC5 wireless interface. The two UEs respectively determine the QoS requirements corresponding to service data transmission according to the QoS requirement of the service, and establishes a PC5 QoS data flow which may guarantee the corresponding QoS requirement between the two UEs to transmit the service data, so as to guarantee the service quality of the service in PC5 communication.

Herein, the QoS parameters of the PC5 QoS data flow include a PQI (PC5 5QI), and the PQI may be mapped to a series of QoS features such as a time delay, a bit error rate and a scheduling priority.

Figure 4:
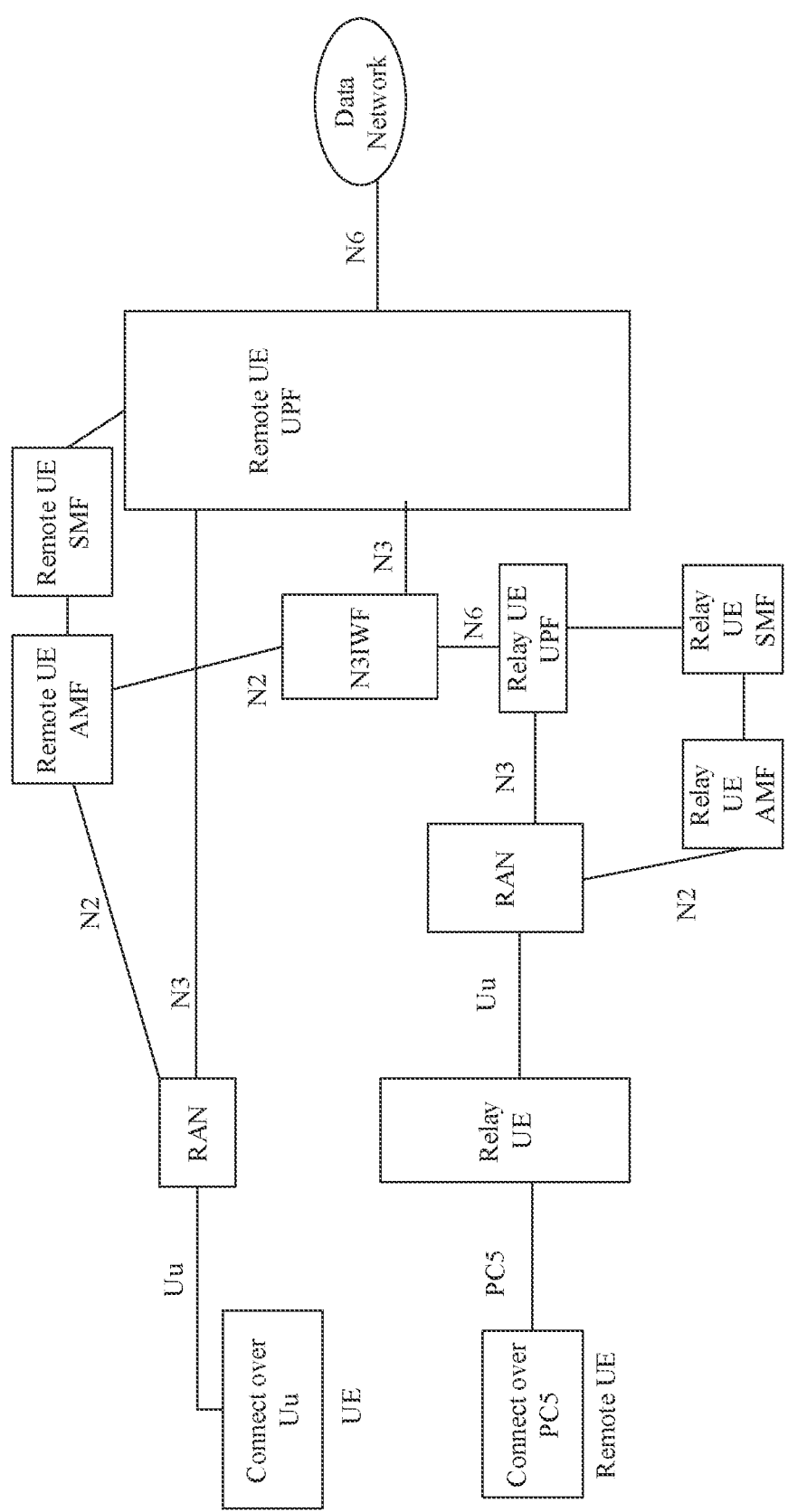
FIG. 4 is a schematic diagram of accessing, by remote UE, a core network through N3IWF according to an embodiment of the disclosure.

When one UE may be connected to the external data network through the 5G network and be ProSe capable, the UE may act as relay UE, and another remote UE with ProSe capability may establish a direct connection with the relay UE through the PC5 interface. Furthermore, the remote UE may interact with an N3IWF through a PDU session established by the relay UE and the 5G network. Referring to FIG. 4, the remote UE may access a 5G core network serving the remote UE through the N3 IWF and communicate with the data network.

According to the existing provisions, in a scenario of FIG. 4, when the remote UE performs service interaction with a data network thereof, a QoS parameter between the remote UE and the data network is controlled by the core network of the remote UE, and the N3IWF may obtain the QoS parameter for data interaction between the remote UE and the N3IWF from the core network (PCF) of the remote UE. However, since the data interaction between the remote UE and the N3IWF is transmitted through the PC5 interface between the remote UE and the relay UE and the PDU session established by the relay UE and the 5G network, if the QoS parameter of the PC5 interface or the QoS parameter of the PDU session of the relay UE may not be set correctly, a correct QoS guarantee may not be provided for the services between the remote UE and the data network, which will affect the service experience of the remote UE, and need to be optimized.

Figure 5:
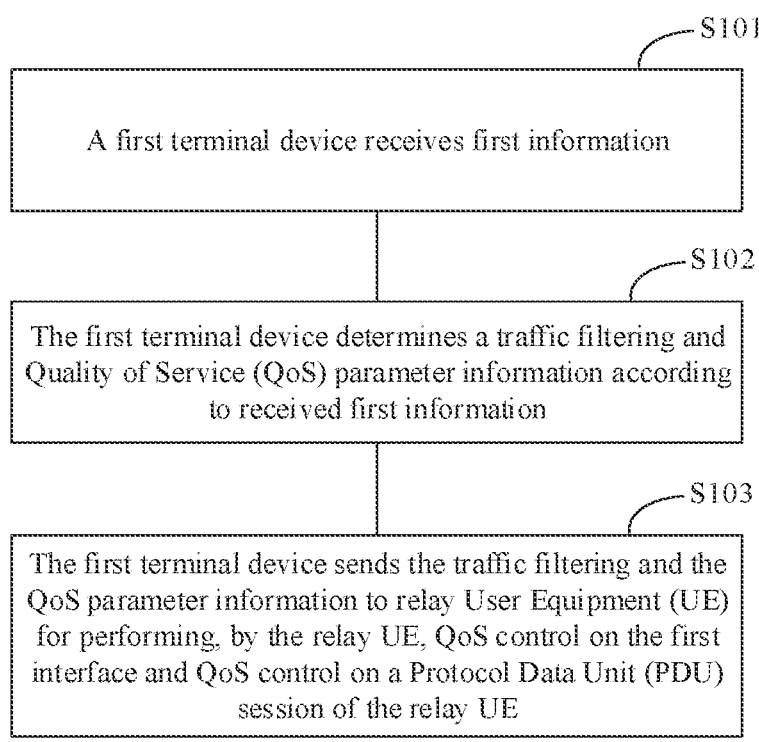

Therefore, the embodiments of the disclosure provide a QoS control method, applied to a first terminal device. The first terminal device is used as remote UE, the first terminal device accesses a core network of the first terminal device through relay UE and a first designated network element, and the first terminal device is in communication connection with the relay UE through a first interface. Referring to FIG. 5, the QoS control method includes the following operations.

At S101, the first terminal device receives first information.

At S102, the first terminal device determines traffic filtering information and QoS parameter information according to received first information.

At S103, the first terminal device sends the traffic filtering information and the QoS parameter information to the relay UE for performing, by the relay UE, QoS control on the first interface and QoS control on a PDU session of the relay UE.

According to the embodiment of the disclosure, the remote UE sends the QoS information about data interaction between the remote UE and the designated network element (such as an N3IWF) to the relay UE, and the relay UE performs QoS control on the first interface (such as a PC5 interface) and QoS control on the PDU session of the relay UE. Thus, the relay UE may correctly set the QoS parameter of the first interface and the QoS parameter of the PDU session of the relay UE, and based on this, the relay UE may provide a correct QoS guarantee for the services between the remote UE and the data network, so as to achieve the purpose of improving the service experience of the remote UE.

According to the embodiment of the disclosure, optionally, the first information includes at least one of the following information sent by the first designated network element: a Security Parameter Index (SPI), a Differentiated Services Code Point (DSCP), or first QoS information.

According to the embodiment of the disclosure, optionally, the first QoS information includes a first QoS identifier and/or code rate information.

According to the embodiment of the disclosure, optionally, the first QoS information further includes time delay requirement information and/or bit error rate requirement information.

According to the embodiment of the disclosure, optionally, the operation that the first terminal device determines the traffic filtering information and the QoS parameter information according to the received first information includes the following operations.

The first terminal device determines that the traffic filtering information includes the SPI and/or the DSCP.

The first terminal device determines that the QoS parameter information includes the first QoS information.

According to the embodiment of the disclosure, optionally, the first information further includes: first mapping relationship information sent by a first core network element of the first terminal device, the first mapping relationship information including a mapping relationship from the DSCP to a second QoS identifier. The first terminal device determines the second QoS identifier according to the first mapping relationship information and a received DSCP.

According to the embodiment of the disclosure, optionally, the operation that the first terminal device determines the traffic filtering information and the QoS parameter information according to the received first information includes the following operations.

The first terminal device determines that the traffic filtering information includes the SPI and/or the DSCP.

The first terminal device determines that the QoS parameter information includes the second QoS identifier determined according to the first mapping relationship information.

According to the embodiment of the disclosure, optionally, the QoS parameter information further includes the code rate information in the first QoS information.

According to the embodiment of the disclosure, optionally, the first information further includes: second mapping relationship information sent by the first core network element of the first terminal device, the second mapping relationship information including a mapping relationship from a first QoS identifier to a second QoS identifier. The first terminal device determines the second QoS identifier according to the second mapping relationship information and the first QoS identifier in received first QoS information.

According to the embodiment of the disclosure, optionally, the operation that the first terminal device determines the traffic filtering information and the QoS parameter information according to the received first information includes the following operations.

The first terminal device determines that the traffic filtering information includes the SPI and/or the DSCP.

The first terminal device determines that the QoS parameter information includes the second QoS identifier determined according to the second mapping relationship information.

According to the embodiment of the disclosure, optionally, the QoS parameter information further includes the code rate information in the first QoS information.

According to the embodiment of the disclosure, optionally, the first QoS identifier includes a 5QI; and/or, the second QoS identifier includes a PQI.

According to the embodiment of the disclosure, the first designated network element optionally comprises an N3IWF: and/or, the first interface includes a PC5 interface; and/or, the first core network element of the first terminal device includes a PCF of the first terminal device.

Correspondingly, the embodiments of the disclosure also provide a QoS control method, applied to relay UE. Remote UE accesses a core network of the remote UE through the relay UE and a first designated network element, and the remote UE is in communication connection with the relay UE through a first interface. Referring to FIG. 6, the QoS control method includes the following operation.

At S201, the relay UE receives traffic filtering information and QoS parameter information sent by the remote UE for performing, by the relay UE, QoS control on the first interface and QoS control on a PDU session of the relay UE.

According to the embodiment of the disclosure, optionally, the traffic filtering information includes an SPI and/or a DSCP, and the QoS parameter information includes first QoS identifier information and/or code rate information.

According to the embodiment of the disclosure, optionally, the first QoS identifier includes a 5QI.

According to the embodiment of the disclosure, optionally, the traffic filtering information includes an SPI and/or a DSCP, and the QoS parameter information includes a second QoS identifier.

According to the embodiment of the disclosure, optionally, the second QoS identifier includes a PQI.

According to the embodiment of the disclosure, optionally, the QoS parameter information further includes code rate information.

According to the embodiment of the disclosure, optionally, the first designated network element includes an N3IWF; and/or, the first interface includes a PC5 interface.

Correspondingly, the embodiments of the disclosure also provide a QoS control method, applied to a first core network element. The first core network element serves remote UE. The remote UE accesses a core network of the remote UE through relay UE and a first designated network element, and the remote UE is in communication connection with the relay UE through a first interface. Referring to FIG. 7, the QoS control method includes the following operation.

At S301, the first core network element sends mapping relationship information to the remote UE, the mapping relationship information being used for the remote UE to determine QoS parameter information. After the remote UE sends the QoS parameter information to the relay UE, the relay UE performs QoS control on the first interface and QoS control on a PDU session of the relay UE based on the QoS parameter information.

According to the embodiment of the disclosure, optionally, the mapping relationship information includes a mapping relationship from a DSCP to a second QoS identifier for determining, by the remote UE, the second QoS identifier according to the mapping relationship information and a received DSCP. Herein, the DSCP is sent to the remote UE by the first designated network element.

According to the embodiment of the disclosure, optionally, the mapping relationship information includes a mapping relationship from a first QoS identifier to the second QoS identifier for determining, by the remote UE, the second QoS identifier according to the mapping relationship information and a received first QoS identifier. Herein, the first QoS identifier is sent to the remote UE by the first designated network element.

According to the embodiment of the disclosure, optionally, the first QoS identifier includes a 5QI; and/or, the second QoS identifier includes a PQI.

According to the embodiment of the disclosure, optionally, the first designated network element includes an N3IWF: and/or, the first interface includes a PC5 interface; and/or, the first core network element includes a PCF of the remote UE.

Figure 8:
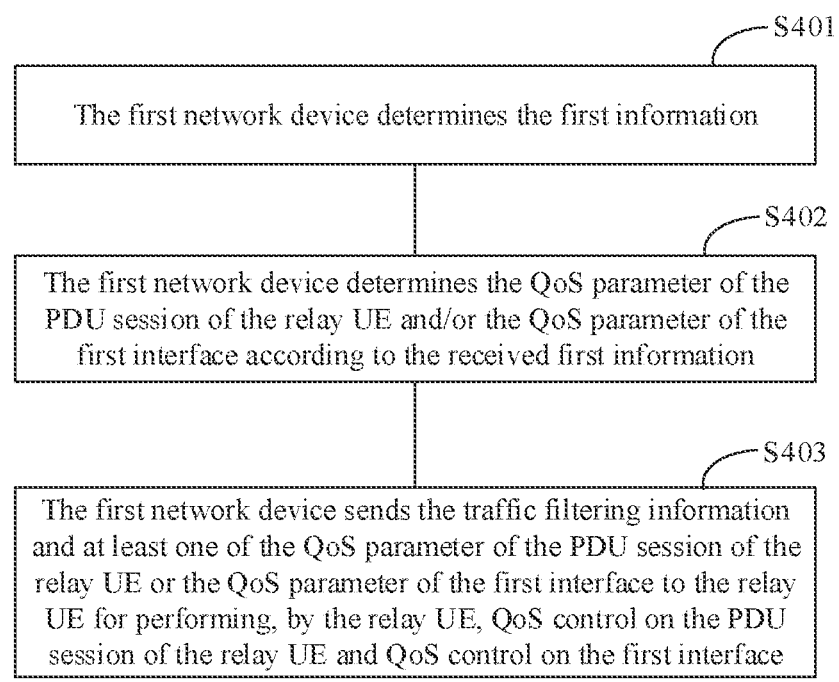

Different from the above embodiments, the embodiments of the disclosure provide a QoS control method, applied to a first network device. Remote UE accesses a core network of the remote UE through relay UE and a first designated network element, the remote UE is in communication connection with the relay UE through a first interface, and the first network device may include a core network element of the relay UE. Referring to FIG. 8, the QoS control method includes the following operations.

At S401, the first network device receives first information.

At S402, the first network device determines a QoS parameter of a PDU session of the relay UE and/or a QoS parameter of the first interface according to the received first information.

At S403, the first network device sends traffic filtering information and at least one of the QoS parameter of the PDU session of the relay UE or the QoS parameter of the first interface to the relay UE for performing, by the relay UE, QoS control on the PDU session of the relay UE and QoS control on the first interface.

According to the embodiment of the disclosure, a designated network element (such as an N3IWF) sends QoS information about data interaction between the remote UE and the N3IWF to the core network element (such as a PCF serving the relay UE) of the relay UE, and the PCF of the relay UE performs QoS control on the PDU session of the relay UE and QoS control on the first interface (such as a PC5 interface). Thus, the PCF of the relay UE may correctly set the QoS parameter of the PDU session of the relay UE and the QoS parameter of the first interface, and based on this, the PCF of the relay UE may provide a correct QoS guarantee for the services between the remote UE and the data network, so as to achieve the purpose of improving the service experience of the remote UE.

According to the embodiment of the disclosure, optionally, the first information includes at least one of the following information sent by the first designated network element: an SPI, a DSCP, or first QoS information.

According to the embodiment of the disclosure, optionally, the first QoS information includes a first QoS identifier and/or code rate information.

According to the embodiment of the disclosure, optionally, the first QoS identifier includes a 5QI.

According to the embodiment of the disclosure, optionally, the first QoS information further includes time delay requirement information and/or bit error rate requirement information.

According to the embodiment of the disclosure, optionally, the operation that the first network device determines the QoS parameter of the PDU session of the relay UE and/or the QoS parameter of the first interface according to the received first information includes that: the first network device determines the QoS parameter of the PDU session of the relay UE and/or the QoS parameter of the first interface according to received first QoS information.

According to the embodiment of the disclosure, optionally, the operation that the first network device determines the QoS parameter of the PDU session of the relay UE and/or the QoS parameter of the first interface according to the received first information includes that: the first network device determines the QoS parameter of the PDU session of the relay UE and/or the QoS parameter of the first interface according to a received DSCP.

According to the embodiment of the disclosure, optionally, the traffic filtering information includes the SPI and/or the DSCP According to the embodiment of the disclosure, optionally, the first designated network element includes the N3IWF: and/or, the first interface includes the PC5 interface; and/or, the first network device includes the PCF of the relay UE.

Correspondingly, the embodiments of the disclosure provide a QoS control method, applied to relay UE. Remote UE accesses a core network of the remote UE through the relay UE and a first designated network element, and the remote UE is in communication connection with the relay UE through a first interface.

Referring to FIG. 9, the QoS control method includes the following operation.

At S501, the relay UE receives traffic filtering information and at least one of a QoS parameter of a PDU session of the relay UE or a QoS parameter of the first interface that are sent by the first network device for performing, by the relay UE, QoS control on the PDU session of the relay UE and QoS control on the first interface.

According to the embodiment of the disclosure, optionally, the traffic filtering information includes an SPI and/or a DSCP.

According to the embodiment of the disclosure, optionally, the first designated network element includes an N3IWF; and/or, the first interface includes a PC5 interface; and/or, the first network device includes a PCF of the relay UE.

Based on the above at least one embodiment, the remote UE takes the SPI and/or DSCP obtained from the N3IWF as the traffic filtering information and determines QoS information according to the information obtained from the N3IWDF, and the remote UE sends the traffic filtering information and the QoS information to the relay UE to perform QoS control; or, the N3IWF may directly send the SPI, DSCP and/or QoS information to the PCF of the relay UE for performing QoS control. Using at least one of the above solutions, the QoS parameter of the PDU session of the relay UE may be set correctly, and the QoS parameter of the PC5 interface may also be set correctly, so as to provide a correct QoS guarantee for the services between the remote UE and the data network, which is conductive to improving the service experience of the remote UE in various scenarios.

Various implementation modes of the QoS control method of the embodiments of the disclosure are described above, and specific implementation processes of the embodiments of the disclosure is described below by specific examples.

Embodiment 1

In this embodiment, the remote UE sends the QoS information about data interaction between the remote UE and the N3IWF to the relay UE, and the relay UE performs QoS control on the PC5 interface and QoS control on the PDU session of the relay UE.

Figure 10:
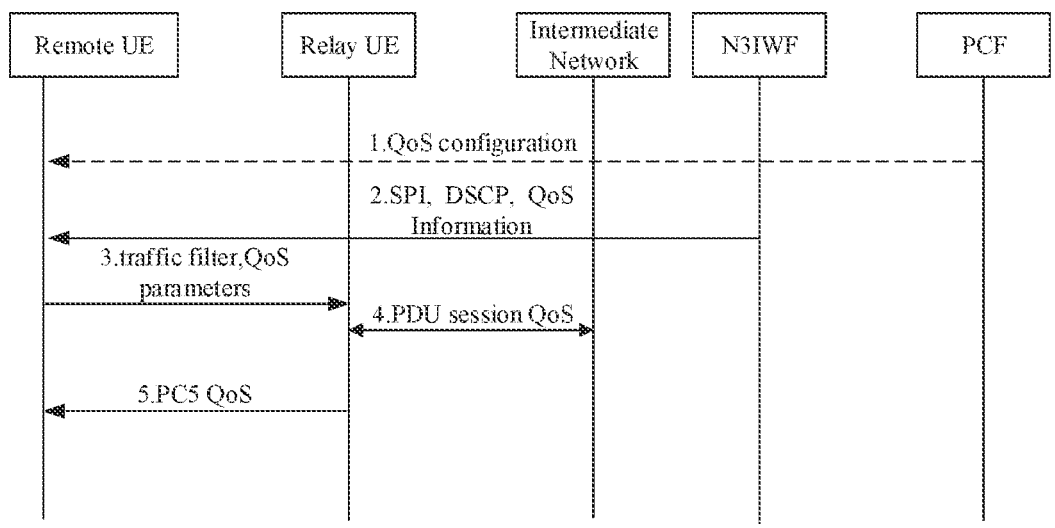
FIGS. 10 and 11 are schematic diagrams of an information interaction process between each UE and each network element in different embodiments of the disclosure.

FIG. 10 illustrates an information interaction process between each UE and each network element in the embodiment. Referring to S2 in FIG. 10, the N3IWF sends the SPI, the DSCP and the first QoS information about data interaction between the remote UE and the N3IWF to the remote UE. Optionally, the first QoS information includes a 5QI and a code rate. Optionally, the first QoS information may further include QoS feature values such as time delay requirements and bit error rate requirements. Specifically, the remaining steps may be completed in the following cases.

Case 1:

Referring to S3 in FIG. 10, the remote UE takes the SPI and/DSCP obtained in S2 as the traffic filtering information, and provides the traffic filtering information and the first QoS information obtained in S2 for the relay UE. Then, the relay UE performs QoS control on the PDU session of the relay UE and the PC5 interface according to the information obtained from remote UE.

Case 2:

Referring to S1 in FIG. 10, the PCF configures the mapping relationship from the DSCP to the PQI to the remote UE, and the remote UE determines the PQI from the DSCP obtained in S2. The remote UE uses the SPI and/or DSCP obtained in S2 as the traffic filtering information, and provides the traffic filtering information and the second QoS information for the relay UE, the second QoS information including the PQI determined by the remote UE according to the DSCP. Optionally, the second QoS information further includes part of the information in the first QoS information obtained in S2, such as code rate information. Then, the relay UE performs QoS control on the PDU session of the relay UE and the PC5 interface according to the information obtained from remote UE.

Case 3:

Referring to S1 in FIG. 10, the PCF configures the mapping relationship from the 5QI to the PQI to the remote UE, and the remote UE determines the second QoS information according to the mapping relationship and the first QoS information obtained in S2, for example, the 5QI in the first QoS information is mapped to the PQI, and the second QoS information may include other information in the first QoS information, such as code rate information. The remote UE uses the SPI and/or DSCP obtained in S2 as the traffic filtering information, and provides the traffic filtering information and the second QoS information for the relay UE. Then, the relay UE performs QoS control on the PDU session of the relay UE and the PC5 interface according to the information obtained from the remote UE.

Embodiment 2

In this embodiment, the N3IWF sends the QoS information about data interaction between the remote UE and the N3IWF to the core network element (such as the PCF serving the relay UE) of the relay UE, and the PCF of the relay UE performs QoS control on the PDU session of the relay UE and/or QoS control on the PC5 interface.

Figure 11:
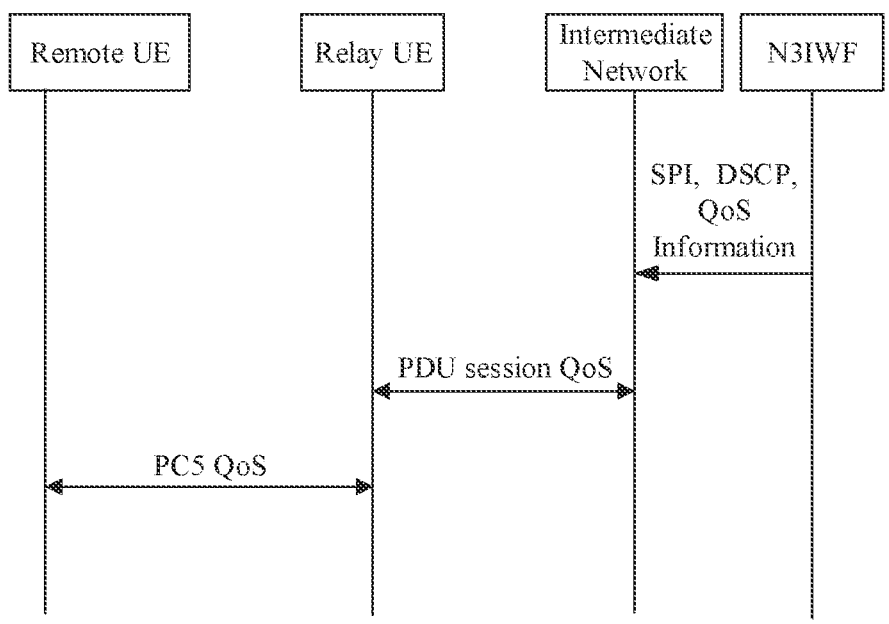

FIG. 11 illustrates an information interaction process between each UE and each network element in the embodiment. Referring to FIG. 11, the N3IWF sends the SPI, the DSCP and/or the first QoS information about data interaction between the remote UE and the N3IWF to the PCF of the remote UE. Optionally, the first QoS information includes a 5QI and a code rate. Optionally, the first QoS information may further include QoS feature values such as time delay requirements and bit error rate requirements. Specifically, the remaining steps may be completed in the following cases.

Case 1:

Referring to FIG. 11, the PCF of the relay UE determines the QoS parameter of the PDU session of the relay UE and/or the QoS parameter of the PC5 interface according to the first QoS information, and uses the SPI and/or the DSCP as the traffic filtering information, and the PCF sends the traffic filtering information and at least one of the QoS parameter of the PDU session of the relay UE or the QoS parameter of the PC5 interface to the relay UE through the SMF of the relay UE for performing QoS control. Herein, the PCF of the relay UE is included in an intermediate network illustrated in FIG. 11.

Case 2:

Referring to FIG. 11, the PCF of the relay UE determines the QoS parameter of the PDU session of the relay UE and/or the QoS parameter of the PC5 interface according to the DSCP, and uses the SPI and/or the DSCP as the traffic filtering information, and the PCF sends the traffic filtering information and at least one of the QoS parameter of the PDU session of the relay UE or the QoS parameter of the PC5 interface to the relay UE through the SMF of the relay UE for performing QoS control. Herein, the PCF of the relay UE is included in the intermediate network illustrated in FIG. 11.

Based on at least one of the above embodiments of the disclosure, in a scenario where the remote UE interacts with the N3IWF through the PDU session of the relay UE, accesses the 5G core network serving the remote UE through the N3IWF, and communicates with the data network, the QoS parameter of the PDU session of the relay UE may be correctly set, so as to provide a correct QoS guarantee for the services between the remote UE and the data network, thereby improving the service experience of the remote UE in a similar scenario by using the embodiments of the disclosure.

Figure 12:
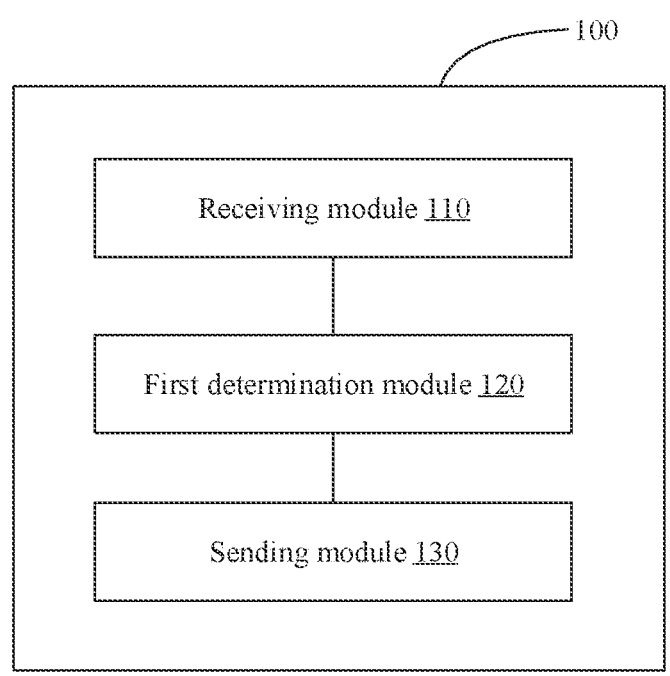
FIGS. 12, 13 and 16 are schematic structural block diagram of a terminal device according to different embodiments of the disclosure.

The specific setting and implementation mode of the embodiments of the disclosure are described from different angles through the above multiple embodiments. Corresponding to the processing method of the above at least one embodiment, the embodiments of the disclosure also provide a terminal device 100. The terminal device 100 accesses a core network of the terminal device through relay UE and a first designated network element, and the terminal device is in communication connection with the relay UE through a first interface. Referring to FIG. 12, the terminal device includes: a receiving module 110, a first determination module 120 and a sending module 130.

The receiving module 110 is configured to receive first information.

The first determination module 120 is configured to determine traffic filtering information and QoS parameter information according to received first information.

The sending module 130 is configured to send the traffic filtering information and the QoS parameter information to the relay UE for performing, by the relay UE, QoS control on the first interface and QoS control on a PDU session of the relay UE.

Optionally, the first information includes at least one of the following information sent by the first designated network element: an SPI, a DSCP, or first QoS information.

Optionally, the first QoS information includes a first QoS identifier and/or code rate information.

Optionally, the first QoS information further includes time delay requirement information and/or bit error rate requirement information.

Optionally, the first determination module includes: a first determination sub-module and a second determination sub-module.

The first determination sub-module is configured to determine that the traffic filtering information includes the SPI and/or the DSCP.

The second determination sub-module is configured to determine that the QoS parameter information includes the first QoS information.

Optionally, the first information further includes: first mapping relationship information sent by a first core network element of the terminal device, the first mapping relationship information including a mapping relationship from the DSCP to a second QoS identifier. The terminal device further includes a second determination module, configured to determine the second QoS identifier according to the first mapping relationship information and a received DSCP.

Optionally, the first determination module includes: a third determination sub-module and a fourth determination sub-module.

The third determination sub-module is configured to determine that the traffic filtering information includes the SPI and/or the DSCP.

The fourth determination sub-module is configured to determine that the QoS parameter information includes the second QoS identifier determined according to the first mapping relationship information.

Optionally, the QoS parameter information further includes the code rate information in the first QoS information.

Optionally, the first information further includes: second mapping relationship information sent by the first core network element of the terminal device, the second mapping relationship information including a mapping relationship from a first QoS identifier to a second QoS identifier. The terminal device further includes a third determination module, configured to determine the second QoS identifier according to the second mapping relationship information and the first QoS identifier in received first QoS information.

Optionally, the first determination module includes: a fifth determination sub-module and a sixth determination sub-module.

The fifth determination sub-module is configured to determine that the traffic filtering information includes the SPI and/or the DSCP.

The sixth determination sub-module is configured to determine that the QoS parameter information includes the second QoS identifier determined according to the second mapping relationship information.

Optionally, the QoS parameter information further includes the code rate information in the first QoS information.

Optionally, the first QoS identifier includes a 5QI; and/or, the second QoS identifier includes a PQI.

Optionally, the first designated network element includes an N3IWF; and/or, the first interface includes a PC5 interface: and/or, the first core network element of the terminal device includes a PCF of the terminal device.

Figure 13:
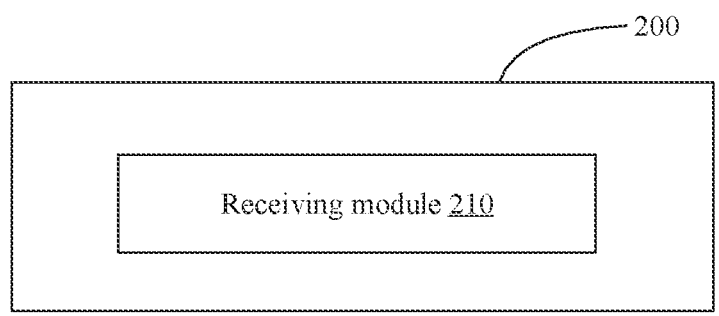

Corresponding to the processing method of the above at least one embodiment, the embodiments of the disclosure also provide a terminal device 200. The terminal device is used as relay UE, remote UE accesses a core network of the remote UE through the terminal device and a first designated network element, and the remote UE is in communication connection with the terminal device through a first interface. Referring to FIG. 13, the terminal device includes: a receiving module 210.

The receiving module 210 is configured to receive traffic filtering information and QoS parameter information sent by the remote UE for performing, by the terminal device, QoS control on the first interface and QoS control on a PDU session of the relay UE.

Optionally, the traffic filtering information includes an SPI and/or a DSCP, and the QoS parameter information includes first QoS identifier information and/or code rate information.

Optionally, the first QoS identifier includes a 5QI.

Optionally, the traffic filtering information includes an SPI and/or a DSCP, and the QoS parameter information includes a second QoS identifier.

Optionally, the second QoS identifier includes a PQI.

Optionally, the QoS parameter information further includes code rate information.

Optionally, the first designated network element includes an N3IWF; and/or, the first interface includes a PC5 interface.

Figure 14:
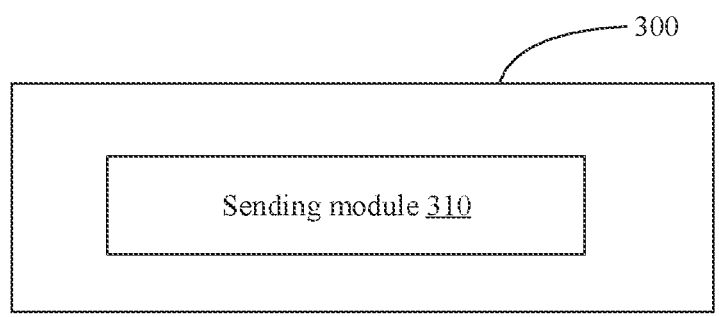
FIGS. 14 and 15 are schematic structural block diagrams of a network device according to different embodiments of the disclosure.

Corresponding to the processing method of the above at least one embodiment, the embodiments of the disclosure also provide a network device 300. The network device is used as a core network element, the network device serves remote UE, the remote UE accesses a core network of the remote UE through relay UE and a first designated network element, and the remote UE is in communication connection with the relay UE through a first interface. Referring to FIG. 14, the network device 300 includes a sending module 310.

The sending module 310 is configured to send mapping relationship information to the remote UE, the mapping relationship information being used for the remote UE to determine QoS parameter information. After the remote UE sends the QoS parameter information to the relay UE, the relay UE performs QoS control on the first interface and QoS control on a PDU session of the relay UE based on the QoS parameter information.

Optionally, the mapping relationship information includes a mapping relationship from a DSCP to a second QoS identifier for determining, by the remote UE, the second QoS identifier according to the mapping relationship information and a received DSCP. Herein, the DSCP is sent to the remote UE by the first designated network element.

Optionally, the mapping relationship information includes a mapping relationship from a first QoS identifier to the second QoS identifier for determining, by the remote UE, the second QoS identifier according to the mapping relationship information and a received first QoS identifier Herein, the first QoS identifier is sent to the remote UE by the first designated network element.

Optionally, the first QoS identifier includes a 5QI: and/or, the second QoS identifier includes a PQI.

Optionally, the first designated network element includes an N3IWF; and/or, the first interface includes a PC5 interface; and/or, the network device includes a PCF of the remote UE.

Figure 15:
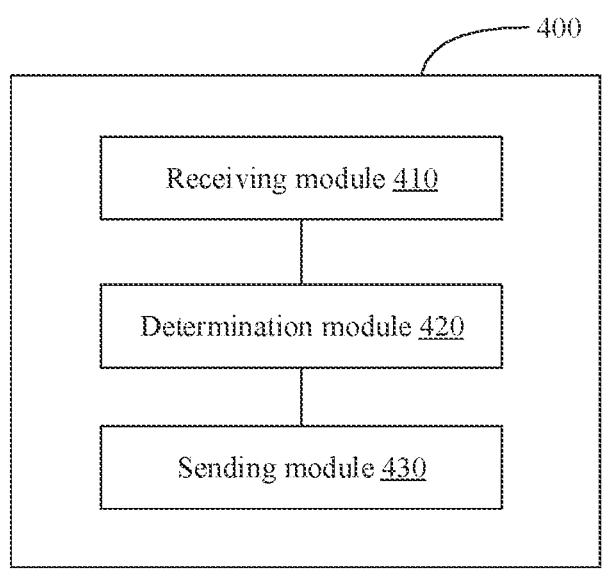

Corresponding to the processing method of the above at least one embodiment, the embodiments of the disclosure also provide a network device 400. The network device is used as a core network element of relay UE, remote UE accesses a core network of the remote UE through the relay UE and a first designated network element, the remote UE is in communication connection with the relay UE through a first interface. Referring to FIG. 15, the network device 400 includes: a receiving module 410, a determination module 420 and a sending module 430.

The receiving module 410 is configured to receive first information.

The determination module 420 is configured to determine a QoS parameter of a PDU session of the relay UE and/or a QoS parameter of the first interface according to the received first information.

The sending module 430 is configured to send traffic filtering information and at least one of the QoS parameter of the PDU session of the relay UE or the QoS parameter of the first interface to the relay UE for performing, by the relay UE, QoS control on the PDU session of the relay UE and QoS control on the first interface.

Optionally, the first information includes at least one of the following information sent by the first designated network element: an SPI, a DSCP, or first QoS information.

Optionally, the first QoS information includes a first QoS identifier and/or code rate information.

Optionally, the first QoS identifier includes a 5QI.

Optionally, the first QoS information further includes time delay requirement information and/or bit error rate requirement information.

Optionally, the determination module includes a first determination sub-module, configured to determine the QoS parameter of the PDU session of the relay UE and/or the QoS parameter of the first interface according to received first QoS information.

Optionally, the determination module includes a second determination sub-module, configured to determine QoS parameter of the PDU session of the relay UE and/or the QoS parameter of the first interface according to a received DSCP.

Optionally, the traffic filtering information includes an SPI and/or a DSCP.

Optionally, the first designated network element includes an N3IWF: and/or, the first interface includes a PC5 interface; and/or, the network device includes a PCF of the relay UE.

Figure 16:
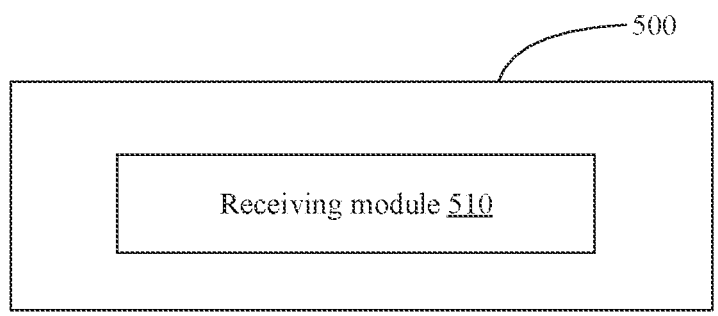

Corresponding to the processing method of the above at least one embodiment, the embodiments of the disclosure also provide a terminal device 500. The terminal device is used as relay UE, remote UE accesses a core network of the remote UE through the terminal device and a first designated network element, and the remote UE is in communication connection with the terminal device through a first interface. Referring to FIG. 16, the terminal device 500 includes: a receiving module 510.

The receiving module 510 is configured to receive traffic filtering information and at least one of a QoS parameter of a PDU session of the terminal device or a QoS parameter of the first interface that are sent by the first network device for performing, by the terminal device, QoS control on the PDU session of the terminal device and QoS control on the first interface.

Optionally, the traffic filtering information includes an SPI and/or a DSCP.

Optionally, the first designated network element includes an N3IWF; and/or, the first interface includes a PC5 interface; and/or, the first network device includes a PCF of the terminal device.

The terminal devices 100, 200 and 500 and the network devices 300 and 400 in the embodiment of the disclosure may realize the corresponding functions of the terminal device in the method embodiment. The process, function, implementation mode, and beneficial effect corresponding to each module (submodule, unit, component, or the like) in the terminal devices 100, 200 and 500 and the network devices 300 and 400 may refer to the corresponding descriptions in the method embodiment, and will not be elaborated herein.

It is to be noted that the function described with respect to each module (submodule, unit, component, or the like) in the terminal devices 100, 200 and 500 and the network devices 300 and 400 of the embodiment of the disclosure may be realized by different modules (submodules, units, components, or the like), or by the same module (submodule, unit, component or the like). For example, the first sending module and the second sending module may be different modules or may be the same module, both of which can realize the corresponding function of the terminal device in the embodiments of the disclosure.

Figure 17:
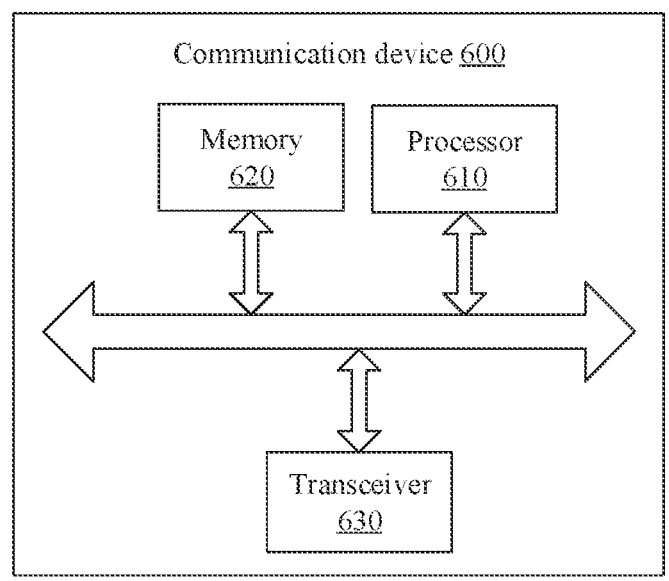
FIG. 17 is a schematic block diagram of a communication device according to an embodiment of the disclosure.

FIG. 17 is a schematic structural diagram of a communication device 600 according to an embodiment of the disclosure. Herein, the communication device 600 includes a processor 610, and the processor 610 may call and run a computer program from a memory to implement the method in the embodiments of the disclosure.

Optionally, the communication device 600 may further include a memory 620. The processor 610 may call and run the computer program from the memory 620 to implement the method in the embodiments of the present disclosure.

The memory 620 may be a separate device independent of the processor 610 or integrated in the processor 610.

Optionally, the communication device 600 may further include a transceiver 630, and the processor 610 may control the transceiver 630 to communicate with other devices. Specifically, same may send information or data to or receive information or data sent by other devices.

The transceiver 630 may include a transmitter and a receiver. The transceiver 630 may further include an antenna, and the number of antennas may be one or more.

Optionally, the communication device 600 may be the network device of the embodiments of the disclosure. The communication device 600 may implement corresponding flows implemented by the network device in each method of the embodiments of the disclosure. For brevity, elaborations are omitted herein.

Optionally, the communication device 600 may be the terminal device of the embodiments of the disclosure. The communication device 600 may implement corresponding flows implemented by the terminal device in each method of the embodiments of the disclosure. For brevity, elaborations are omitted herein.

Figure 18:
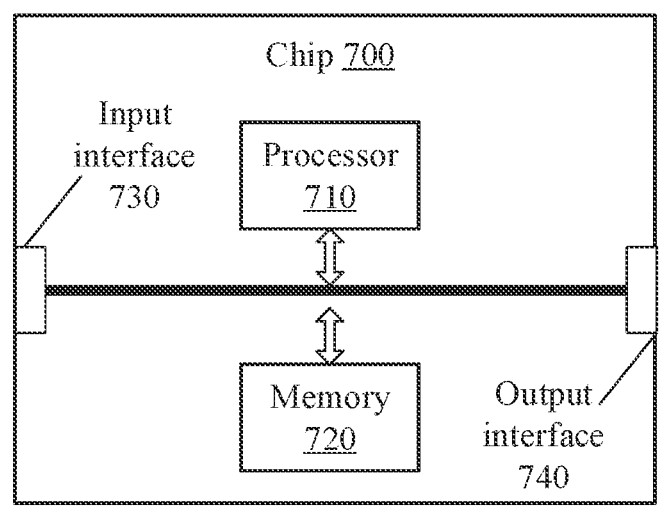
FIG. 18 is a schematic block diagram of a chip according to an embodiment of the disclosure.

FIG. 18 is a schematic structural diagram of a chip 700 according to an embodiment of the disclosure. Herein, the chip 700 includes a processor 710, and the processor 710 may call and run a computer program from a memory to implement the method in the embodiments of the disclosure.

Optionally, the chip 700 may further include a memory 720. The processor 710 may call and run the computer program from the memory 720 to implement the method in the embodiments of the present disclosure.

The memory 720 may be a separate device independent of the processor 710 or integrated in the processor 710.

Optionally, the chip 700 may further include an input interface 730. The processor 710 may control the input interface 730 to communicate with other devices or chips, and specifically, may acquire information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to the network device of the embodiments of the disclosure. The chip may implement corresponding flows implemented by the network device in each method of the embodiments of the disclosure. For brevity, elaborations are omitted herein.

Optionally, the chip may be applied to the terminal device of the embodiment in FIG. 12 or FIG. 13 of the disclosure. The chip may implement corresponding flows implemented by the terminal device in each method of the embodiments of the disclosure. For brevity, elaborations are omitted herein.

It is to be understood that the chip mentioned in the embodiments of the disclosure may also be called a system-level chip, a system chip, a chip system, a system on chip, or the like.

The processor mentioned above may be a general-purpose processor, a Digital Signal Processor (DSP), a Field Programmable Gate Array (FPGA), an Application Specific Integrated Circuit (ASIC), or another programmable logical device, transistor logical device, discrete hardware component, etc. The general-purpose processor mentioned above may be a microprocessor, or any conventional processor, etc.

The memory mentioned above may be a volatile memory or a nonvolatile memory, or may include both volatile and nonvolatile memories. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It is to be understood that the memory is exemplarily but unlimitedly described. For example, the memory in the embodiments of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM). That is, the memory in the embodiments of the disclosure is intended to include, but not limited to, memories of these and any other proper types.

Figure 19:
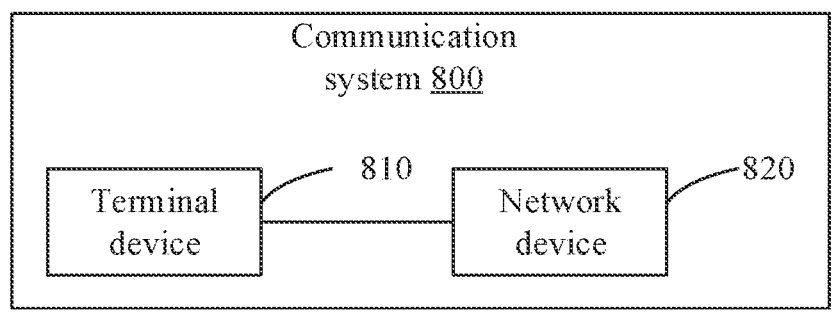
FIG. 19 is a schematic block diagram of a communication system according to an embodiment of the disclosure.

FIG. 19 is a schematic block diagram of a communication system 800 according to an embodiment of the disclosure. The communication system 800 includes a terminal device 810 and a network device 820.

The terminal device 810 may be configured to realize the corresponding functions realized by the terminal device in the method of various embodiments of the disclosure, and the network device 820 may be configured to realize the corresponding functions realized by the network device in the method of various embodiments of the disclosure. For brevity, elaborations are omitted herein.

The embodiments may be implemented completely or partially through software, hardware, firmware or any combination thereof. During implementation with the software, the embodiments may be implemented completely or partially in form of a computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network, or another programmable device. The computer instruction may be stored in a computer readable storage medium or transmitted from a computer readable storage medium to another computer readable storage medium. For example, the computer instruction may be transmitted from a website, computer, server, or data center to another website, computer, server, or data center in a wired (such as coaxial cable, optical fiber, and Digital Subscriber Line (DSL)) or wireless (such as infrared, radio, and microwave) manner. The computer readable storage medium may be any available medium accessible for the computer or a data storage device integrated with one or more available media, such as a server and a data center. The available medium may be a magnetic medium (for example, a floppy disk, a hard disk and a magnetic tape), an optical medium (for example, a Digital Video Disk (DVD)), a semiconductor medium (for example, a Solid State Disk (SSD)), or the like.

It is to be understood that the sequence numbers of the foregoing processes do not mean execution sequences in various embodiments of the disclosure. The execution sequences of the processes should be determined according to functions and internal logics of the processes, and should not be construed as any limitation to the implementation processes of the embodiments of the disclosure.

Those skilled in the art may clearly learn about that specific working processes of the system, device, and unit described above may refer to the corresponding processes in the method embodiment and will not be elaborated herein for ease and briefness of description.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subjected to the scope of protection of the claims.

The invention claimed is:

1. A Quality of Service (QoS) control method, applied to a first terminal device, the first terminal device accessing a core network of the first terminal device through relay User Equipment (UE) and a first designated network element, the first terminal device being in communication connection with the relay UE through a first interface, and the QoS control method comprising:
receiving, by the first terminal device, first information,
determining, by the first terminal device, traffic filtering information and QoS parameter information according to received first information; and
sending, by the first terminal device, the traffic filtering information and the QoS parameter information to the relay UE,
wherein determining, by the first terminal device, the traffic filtering information according to the received first information comprises:
determining, by the first terminal device, that the traffic filtering information comprises a Security Parameter Index (SPI) and a Differentiated Services Code Point (DSCP).

2. The method of claim 1, wherein
the first information comprises at least one of the following information sent by the first designated network element: the DSCP, or first QoS information.

3. The method of claim 2, wherein the first QoS information comprises at least one of: a first QoS identifier or code rate information.

4. The method of claim 3, wherein
the first QoS identifier comprises a 5-th Generation (5G) QoS Identifier (5QI).

5. The method of claim 1, wherein at least one of following applies:
the first designated network element comprises a Non-3GPP InterWorking Function (N3IWF); or,
the first interface comprises a PC5 interface.

6. A Quality of Service (QoS) control method, applied to relay User Equipment (UE), remote UE accessing a core network of the remote UE through the relay UE and a first designated network element, the remote UE being in communication connection with the relay UE through a first interface, and the QoS control method comprising:
receiving, by the relay UE, traffic filtering information and QoS parameter information sent by the remote UE for performing, by the relay UE, QoS control on the first interface and QoS control on a Protocol Data Unit (PDU) session of the relay UE,
wherein the traffic filtering information comprises a Security Parameter Index (SPI) and a Differentiated Services Code Point (DSCP).

7. The method of claim 6, wherein
the QoS parameter information comprises a second QoS identifier.

8. The method of claim 7, wherein the second QoS identifier comprises a PC5 5-th Generation (5G) QoS Identifier (5QI).

9. The method of claim 6, wherein at least one of following applies:
the first designated network element comprises a Non-3GPP InterWorking Function (N3IWF); or
the first interface comprises a PC5 interface.

10. A Quality of Service (QoS) control method, applied to a first network device, remote User Equipment (UE) accessing a core network of the remote UE through relay UE and a first designated network element, the remote UE being in communication connection with the relay UE through a first interface, and the first network device comprising a core network element of the relay UE, the QoS control method comprising:
receiving, by the first network device, first information, determining, by the first network device, at least one of:
a QoS parameter of a Protocol Data Unit (PDU) session of the relay UE or a QoS parameter of the first interface according to received first information; and sending, by the first network device, traffic filtering information and at least one of the QoS parameter of the PDU session of the relay UE or the QoS parameter of the first interface to the relay UE, wherein the traffic filtering information comprises a Security Parameter Index (SPI) and a Differentiated Services Code Point (DSCP).

11. The method of claim 10, wherein
the first information comprises at least one of the following information sent by the first designated network element: the DSCP, or first QoS information.

12. The method of claim 11, wherein the first QoS information comprises at least one of: a first QoS identifier or code rate information.

13. The method of claim 11, wherein the first QoS identifier comprises a 5-th Generation (5G) QoS Identifier (5QI).

14. The method of claim 10, wherein at least one of following applies:
the first designated network element comprises a Non-3GPP InterWorking Function (N3IWF);
the first interface comprises a PC5 interface; or
the first network device comprises a Policy Control Function (PCF) of the relay UE.

15. A terminal device, comprising a processor and a memory, wherein the memory is configured to store computer-executable instructions, and the processor calls and runs the computer-executable instructions stored in the memory to perform the method of claim 1.

16. The terminal device of claim 15, wherein
the first information comprises at least one of the following information sent by the first designated network element: a Differentiated Services Code Point (DSCP), or first QoS information.

17. A terminal device, comprising a processor and a memory, wherein the memory is configured to store computer-executable instructions, and the processor calls and runs the computer-executable instructions stored in the memory to perform the method of claim 6.

18. A network device, comprising a processor and a memory, wherein the memory is configured to store computer-executable instructions, and the processor calls and runs the computer-executable instructions stored in the memory to perform the method of claim 10.

* * * * *